(12) United States Patent
Zauner et al.

(10) Patent No.: US 9,341,092 B2
(45) Date of Patent: May 17, 2016

(54) EXHAUST VALVE ASSEMBLY FOR A TWO-STROKE INTERNAL COMBUSTION ENGINE

(71) Applicant: BRP-POWERTRAIN GMBH & CO. KG, Gunskirchen (AT)

(72) Inventors: Gunther Zauner, St. Willibald (AT); Markus Doppelbauer, Gunskirchen (AT); Christian Berger, Meggenhofen (AT); Ralph Jurjevec, Vienna (AT); Guenther Roland, Pasching (AT)

(73) Assignee: BRP—POWERTRAIN GMBH & Co. KG, Gunskirchen (AT)

( * ) Notice: Subject to any disclaimer, the term of this patent is extended or adjusted under 35 U.S.C. 154(b) by 92 days.

(21) Appl. No.: 14/448,314

(22) Filed: Jul. 31, 2014

(65) Prior Publication Data

US 2016/0032793 A1    Feb. 4, 2016

(51) Int. Cl.
  *F02B 25/00*    (2006.01)
  *F01L 3/08*     (2006.01)
  *F02D 13/02*    (2006.01)

(52) U.S. Cl.
  CPC .............. *F01L 3/08* (2013.01); *F02D 13/0284* (2013.01)

(58) Field of Classification Search
  CPC ....... F02D 13/0284; F02D 13/04; F02D 9/04; F01L 3/08; F02B 2075/025; F02F 1/22
  USPC ............................ 123/65 PE, 65 P, 65 V, 323
  See application file for complete search history.

(56) References Cited

U.S. PATENT DOCUMENTS

| 4,109,462 | A  |   | 8/1978  | Kohama et al. |
| 5,873,334 | A  | * | 2/1999  | Heinrich .................. 123/65 PE |
| 6,158,215 | A  | * | 12/2000 | Bosch et al. ..................... 60/312 |
| 6,189,494 | B1 | * | 2/2001  | Nagumo et al. .......... 123/65 PE |
| 6,216,648 | B1 |   | 4/2001  | Spaulding |
| 6,244,227 | B1 |   | 6/2001  | Matte |
| 6,352,056 | B1 |   | 3/2002  | Ruman |

(Continued)

FOREIGN PATENT DOCUMENTS

EP        1988270 A1    11/2008

OTHER PUBLICATIONS

Extended European Search Report of Patent Application EP 14193318.4; EPO; Munich; Feb. 5, 2016; Flavio Marsano.

(Continued)

*Primary Examiner* — Marguerite McMahon
(74) *Attorney, Agent, or Firm* — BCF LLP

(57) ABSTRACT

An exhaust valve assembly for a two-stroke internal combustion engine has a valve actuator having a first pressure chamber and a second pressure chamber, and a valve operatively connected to the valve actuator. The first and second pressure chambers are adapted for selectively receiving one of a first pressure and a second pressure. The first pressure is higher than the second pressure. The valve actuator moves the valve between at least a first valve position and a second valve position. The valve actuator moves the valve to the first valve position when the first pressure is supplied to the first pressure chamber and the second pressure is supplied to the second pressure chamber. The valve actuator moves the valve to the second valve position when the second pressure is supplied to the first pressure chamber and the first pressure is supplied to the second pressure chamber.

20 Claims, 13 Drawing Sheets

(56) References Cited

U.S. PATENT DOCUMENTS

| | | |
|---|---|---|
| 6,371,156 B1 | 4/2002 | Walton et al. |
| 7,213,554 B2 | 5/2007 | Kanada et al. |
| 7,484,482 B1 | 2/2009 | Mayringer |
| 7,762,220 B2 | 7/2010 | Okanovic et al. |
| 8,201,526 B2 | 6/2012 | Sekira |
| 2005/0166872 A1* | 8/2005 | Zauner .................. 123/65 PE |
| 2009/0088942 A1 | 4/2009 | Okanovic |

OTHER PUBLICATIONS

English abstract of EP1988270; retrieved from http://worldwide.espacenet.com/ on Feb. 2, 2016.

* cited by examiner

EXHAUST VALVE ASSEMBLY FOR A TWO-STROKE INTERNAL COMBUSTION ENGINE

FIELD OF TECHNOLOGY

The present technology relates to an exhaust valve assembly suitable for use with an exhaust port of a two stroke internal combustion engine.

BACKGROUND

In order to ensure that two-stroke engines have a high power capacity at high speeds, a high volumetric efficiency is required and the charge losses must be minimized. This can be accomplished by an early and therefore higher opening of the exhaust passage into the cylinder. The adjustment of the exhaust port, to obtain maximum power capacity of the engine at high speeds involves, in the medium speed range, not only an appreciable decrease of the useful stroke, but also a large increase of the charge losses. As a result, the torque decreases and the specific fuel consumption increases greatly. A higher torque in conjunction with lower fuel consumption can be obtained, at lower engine speeds, only if the opening of the exhaust port happens later in the down stroke of the piston which means that the exhaust port must be at a lower position than it is at high engine speeds.

For this purpose it is known to provide a valve in the exhaust port which is movable between a full flow position and a flow restricting position. When in the flow restricting position, the end of the valve is substantially flush with the peripheral surface of the cylinder bore. In this flow restricting position, the exhaust port is effectively lowered in relation to the down stroke of the piston. The valve is adjustable to vary the relative height of the exhaust port as is required by the given operating conditions of the engine.

U.S. Pat. No. 7,484,482 B1, issued on Feb. 3, 2009 to Mayringer, entitled "Valve Assembly for a Two-Stroke Engine", discloses a valve assembly having a two-part valve provided, in part, in a main exhaust port and auxiliary valves provided, in part, in auxiliary exhaust ports. The valve assembly also has a valve actuator to which the valves are connected. The valve actuator is movable between a lowered position, an intermediate position and a raised position. The two-part valve has a first valve part connected to the actuator and movable with the actuator between the lowered position, the intermediate position, and the raised position. The auxiliary valves are connected to the first valve part and are movable with the first valve part and the actuator between the lowered position, the intermediate position, and the raised position. The two-part valve has a second valve part that is movable between a lowered position and a raised position. When the first valve part is in its lowered position or its intermediate position, the second valve part is in its lowered position. When the first valve part is in its raised position, the second valve part is in its raised position.

The valve actuator of Mayringer has a pressure chamber including a diaphragm. To move the valve actuator between its lowered and raised positions, different pressures are supplied to the pressure chamber from the crankcase of the engine to which the exhaust valve assembly is connected. To move the valve actuator to the raised position, positive pressure is supplied to the pressure chamber. To move the valve actuator to the lowered position, negative pressure is supplied to the pressure chamber. To move the valve actuator to the intermediate position, ambient pressure is supplied to the pressure chamber. A spring also biases the diaphragm toward a position corresponding to the intermediate position of the valve actuator.

Although the above valve actuator can move the valve actuator to three different positions, it has certain drawbacks. First, since the pressure chamber moves between its different positions as a result of a difference between the pressure inside the pressure chamber and the ambient pressure, this pressure difference can be relatively small, which yields a relatively small force to overcome the bias of the spring. Therefore this results in a relatively slow actuation time. The force can be increased by increasing the size of the diaphragm, but there is a limit to the possible size of the diaphragm.

Also, the valve actuator of Mayringer cannot provide three distinct positions in a turbocharged engine. This is because in turbocharged engines, the pressure in the crankcase is always greater than ambient. As a result, the crankcase of a turbocharged engine cannot supply a negative pressure to the pressure chamber of the valve actuator. Therefore, the valve actuator of Mayringer cannot be moved to its lowered position in a turbocharged engine.

Therefore, there is a need for an exhaust valve assembly having a valve actuator that has a relatively fast actuation and that can be used in turbocharged engines.

SUMMARY

It is an object of the present technology to ameliorate at least some of the inconveniences present in the prior art.

An exhaust valve assembly according to implementations of the present technology has a valve actuator that has two pressure chambers and the valve actuator moves a valve. Different pressures are supplied to each pressure chamber, and the pressure difference causes movement of the valve actuator.

In normally aspirated engines using crankcase pressure to supply the pressures to the pressure chambers, this pressure difference can be greater than the difference between any one of the two pressures supplied to the pressure chambers and ambient pressure. As such, the actuation of the valve actuator can be faster than a similarly sized valve actuator having a single pressure chamber.

Also, since the valve actuator operates based on pressure differences between the two pressure chambers, the valve actuator can be used with a turbocharged engine. Although the crankcase pressure in a turbocharged engine is above ambient pressure, the crankcase pressure nonetheless fluctuates as the pistons reciprocate. As such different pressures can be supplied to the two pressure chambers from the crankcase of a turbocharged engine.

According to one aspect of the present technology, there is provided an exhaust valve assembly for a two-stroke internal combustion engine having a valve actuator and a valve operatively connected to the valve actuator. The valve actuator has a first pressure chamber and a second pressure chamber. The first pressure chamber is adapted for selectively receiving one of a first pressure and a second pressure. The second pressure chamber is adapted for selectively receiving one of the first pressure and the second pressure. The first pressure is higher than the second pressure. The valve actuator moves the valve between at least a first valve position and a second valve position. The valve actuator moves the valve to the first valve position when the first pressure is supplied to the first pressure chamber and the second pressure is supplied to the second pressure chamber. The valve actuator moves the valve to the second valve position when the second pressure is supplied to the first pressure chamber and the first pressure is supplied to the second pressure chamber.

According to some implementations of the present technology, the valve actuator moves the valve between the first valve position, the second valve position and a third valve position, the third valve position being intermediate the first and second valve positions. The valve actuator moves the valve to the third valve position when pressures supplied to the first pressure chamber and the second pressure chamber are equal or substantially equal.

According to some implementations of the present technology, the valve actuator moves the valve to the third valve position when one of: the first pressure is supplied to both the first pressure chamber and the second pressure chamber; and the second pressure is supplied to both the first pressure chamber and the second pressure chamber.

According to some implementations of the present technology, the valve actuator moves the valve to the third valve position when a third pressure is supplied to both the first pressure chamber and the second pressure chamber, the third pressure being intermediate the first and second pressures.

According to some implementations of the present technology, a spring biases the valve toward the third valve position.

According to some implementations of the present technology, the valve actuator comprises a diaphragm separating the first pressure chamber from the second pressure chamber. The diaphragm is movable between a first diaphragm position and a second diaphragm position. The diaphragm is in the first diaphragm position when the first pressure is supplied to the first pressure chamber and the second pressure is supplied to the second pressure chamber. The diaphragm is in the second diaphragm position when the second pressure is supplied to the first pressure chamber and the first pressure is supplied to the second pressure chamber. The valve is in the first valve position when the diaphragm is in the first diaphragm position. The valve is in the second valve position when the diaphragm is in the second diaphragm position.

According to some implementations of the present technology, a spring biases the valve toward a third valve position, the third valve position being intermediate the first and second valve positions.

According to some implementations of the present technology, the spring biases the diaphragm toward a third diaphragm position. The third diaphragm position is intermediate the first and second diaphragm positions. The valve is in the third valve position when the diaphragm is in the third diaphragm position.

According to some implementations of the present technology, the spring is disposed in the second pressure chamber.

According to some implementations of the present technology, the valve actuator also has a valve housing and a pressure chamber wall. The valve housing is connected to the diaphragm. The second pressure chamber is defined between the valve housing and the diaphragm. The valve housing is adapted to connect the valve actuator to the engine. The pressure chamber wall is connected to the diaphragm. The first pressure chamber is defined between the pressure chamber wall and the diaphragm.

According to some implementations of the present technology, the valve extends through the valve housing, the diaphragm and the pressure chamber wall.

According to some implementations of the present technology, a first control valve fluidly communicates with the first pressure chamber. A second control valve fluidly communicates with the second pressure chamber. A first feed line fluidly communicates with the first and second control valves for supplying the first pressure to the first and second control valves. A second feed line fluidly communicates with the first and second control valves for supplying the second pressure to the first and second control valves. The first control valve selectively fluidly communicates the first pressure chamber with one of the first and second feed lines. The second control valve selectively fluidly communicates the second pressure chamber with one of the first and second feed lines.

According to some implementations of the present technology, an accumulator chamber fluidly communicates with the first feed line.

According to some implementations of the present technology, the first control valve alternatively fluidly communicates the first pressure chamber with the first and second feed lines to have a third pressure in the first pressure chamber. The second control valve alternatively fluidly communicates the second pressure chamber with the first and second feed lines to have the third pressure in the second pressure chamber. The third pressure is intermediate the first and second pressures. The valve actuator moves the valve to a third position when the third pressure is provided in the first and second pressure chambers. The third position is intermediate the first and second positions.

According to another aspect of the present technology, there is provided an internal combustion engine having a crankcase defining a crankcase chamber, a crankshaft disposed in the crankcase, a cylinder block connected to the crankcase, the cylinder block having an exhaust passage, a cylinder disposed in the cylinder block, a piston movably disposed within the cylinder and being operatively connected to the crankshaft, and the valve assembly recited above connected to the cylinder block. In the first valve position, the valve extends in the exhaust passage. In the second valve position, the valve is withdrawn from the exhaust passage.

According to some implementations of the present technology, the first and second pressure chambers selectively fluidly communicate with the crankcase chamber. The first pressure is a positive pressure and the second pressure is a negative pressure. The crankcase chamber selectively supplies the positive pressure to at least one of the first and second pressure chambers as the piston moves toward the crankcase. The crankcase chamber selectively supplies the negative pressure to at least one of the first and second pressure chambers as the piston moves away from the crankcase.

According to some implementations of the present technology, a first one-way valve permits the positive pressure to be selectively supplied to at least one of the first and second pressure chambers and prevents the negative pressure to be selectively supplied to at least one of the first and second pressure chambers. A second one-way valve permits the negative pressure to be selectively supplied to at least one of the first and second pressure chambers and prevents the positive pressure to be selectively supplied to at least one of the first and second pressure chambers.

According to another aspect of the present technology, there is provided a method of operating an exhaust valve assembly of a two-stroke internal combustion engine. The valve assembly includes a valve actuator having a first pressure chamber and a second pressure chamber, and a valve operatively connected to the valve actuator. The method comprising: moving the valve to a first valve position by supplying a first pressure to the first pressure chamber and a second pressure to the second pressure chamber; and moving the valve to a second valve position by supplying the second pressure to the first pressure chamber and the first pressure to the second pressure chamber. The first pressure is higher than the second pressure.

According to some implementations of the present technology, the method further comprises moving the valve to a third valve position by supplying equal or substantially equal pressures to the first pressure chamber and the second pressure chamber. The third valve position is intermediate the first and second valve positions.

According to some implementations of the present technology, the method further comprises biasing the valve toward the third valve position using a spring.

For purposes of the present application, the term "ambient pressure" means a pressure of the surrounding fluid, the term "positive pressure" means a pressure which is greater than the ambient pressure, and the term "negative pressure" means a pressure which is less than the ambient pressure. Also, the term "supply a negative pressure" should be understood to mean that the pressure inside the component to which the negative pressure is being supplied is being reduced to the negative pressure. The negative pressure is said to be supplied even though, as would be understood, air is actually being removed from the component to which the negative pressure is being supplied. Should the definition of a term provided in a document incorporated herein by reference differ from the definition of the same term provided in the present application, the definition provided in the present application takes precedence.

Implementations of the present technology each have at least one of the above-mentioned object and/or aspects, but do not necessarily have all of them. It should be understood that some aspects and/or implementations of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
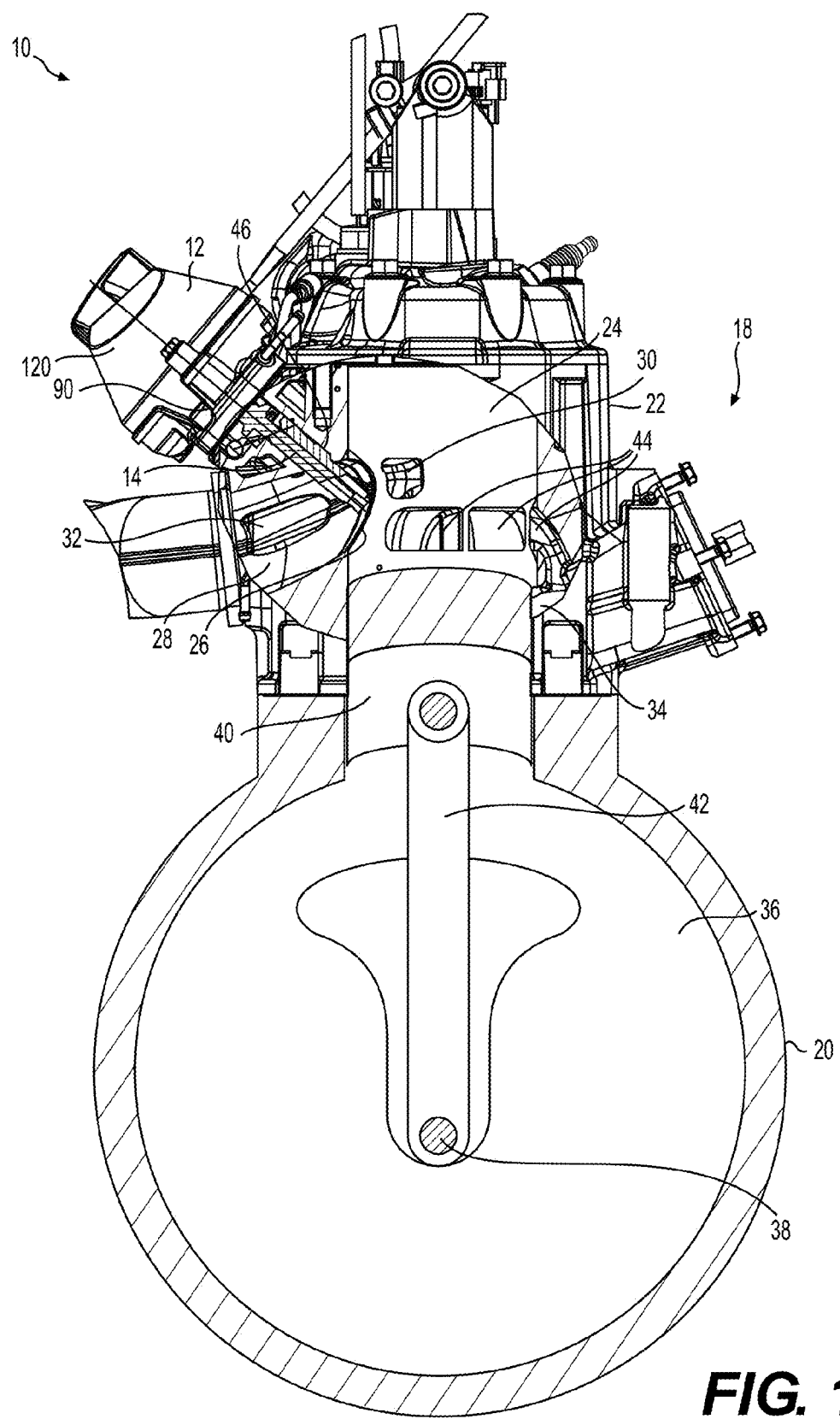
FIG. 1 is a partial cross-sectional view of a two-stroke engine having exhaust valve assemblies.

An exhaust valve assembly 10 has a valve actuator 12, a two-part valve 14 connected to the actuator 12 and auxiliary valves 16 (FIG. 4A) connected to the valve 14. A two-stroke engine 18 (FIG. 1) has two such exhaust valve assemblies 10 (only one being shown). It should be understood that the term "two-stroke engine" includes an engine having at least one cylinder. The engine 18 comprises a crankcase 20 and a cylinder block 22 connected to the crankcase 20. Two cylinders 24 (only one being shown), defined in the cylinder block 22, each have a main exhaust port 26. Each main exhaust port 26 communicates with a corresponding exhaust passage 28. Auxiliary exhaust ports 30 are disposed on each side of each main exhaust port 26 so as to be symmetrical to the main exhaust port 26. The auxiliary exhaust ports 30 are connected to their corresponding exhaust passages 28 by way of auxiliary passages 32. Two admission ports 34 (one per cylinder 24) are defined in the cylinder block 22. The crankcase 20 has two internal chambers 36 (one per cylinder) communicating with their corresponding admission ports 34. A crankshaft 38 is disposed in the internal chambers 36 of the crankcase 20. Two pistons 40 are connected to the crankshaft 38 via connecting rods 42 and reciprocate in their corresponding cylinders 24 during operation of the engine 18. The pistons 40 are adapted to open or close the main exhaust ports 26, the auxiliary exhaust ports 30 and transfer ports 44. It is contemplated that the engine 18 could have only one or more than two cylinders 24. It should be understood that in this case, the engine 18 would have a number of components, such as pistons 40, corresponding to the number of cylinders 24.

For simplicity, explanations will now be provided for one of the cylinders 24 and its associated components. It should be understood that these explanations also apply to the other cylinder 24 and its associated components.

When the engine 18 is operating at low or medium speeds, the main exhaust port 26 and the auxiliary exhaust ports 30 should not be exposed prematurely by the piston 40, as the latter moves downwardly. Such a premature exposure of the main exhaust port 26 and the auxiliary exhaust ports 30 is prevented by the valve 14. The valve 14 is slidably mounted in a guide channel 46 having a longitudinal direction that is approximately radial with respect to the cylinder 24 and extends at an acute angle to the axis of the main exhaust passage 26. Auxiliary guide channels (not shown) are provided parallel to the guide channel 46 in the area of the auxiliary passages 32 to receive the auxiliary valves 16.

Figure 4A:
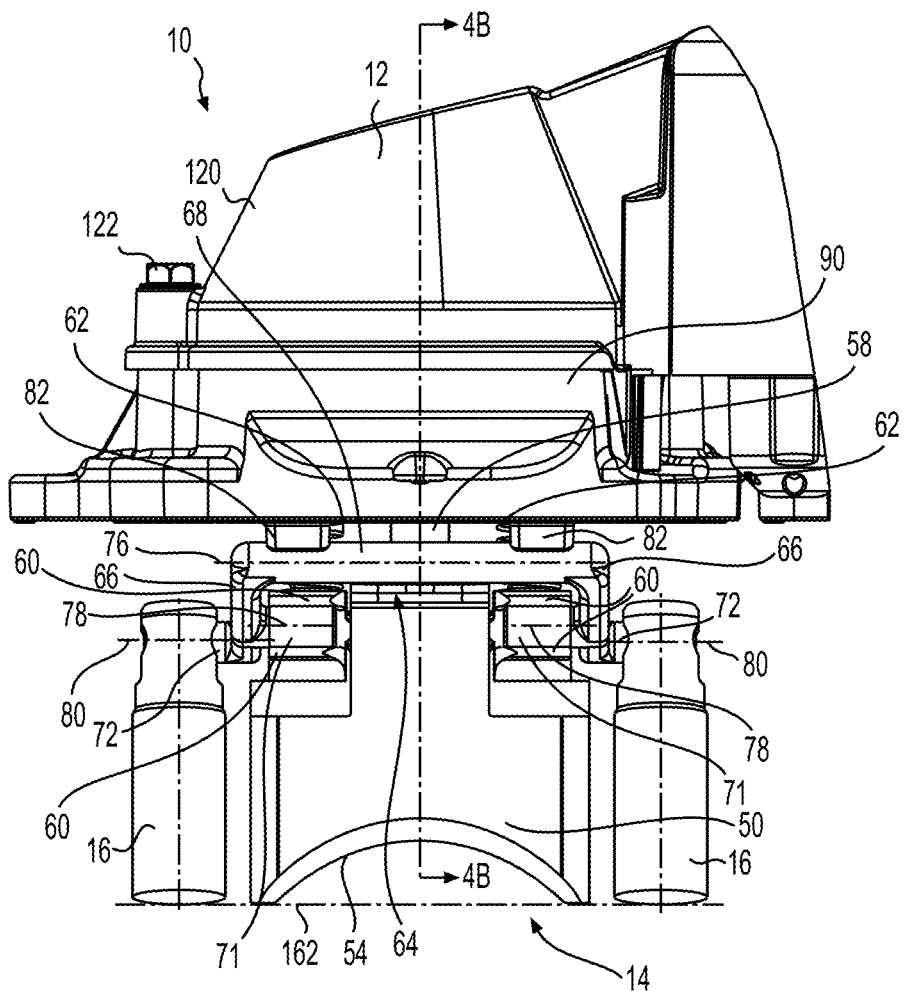
FIG. 4A is a front elevation view of one of the exhaust valve assemblies of the engine of FIG. 1 with a first valve part, a second valve part and auxiliary valves in flow restricting positions.
Figure 4B:
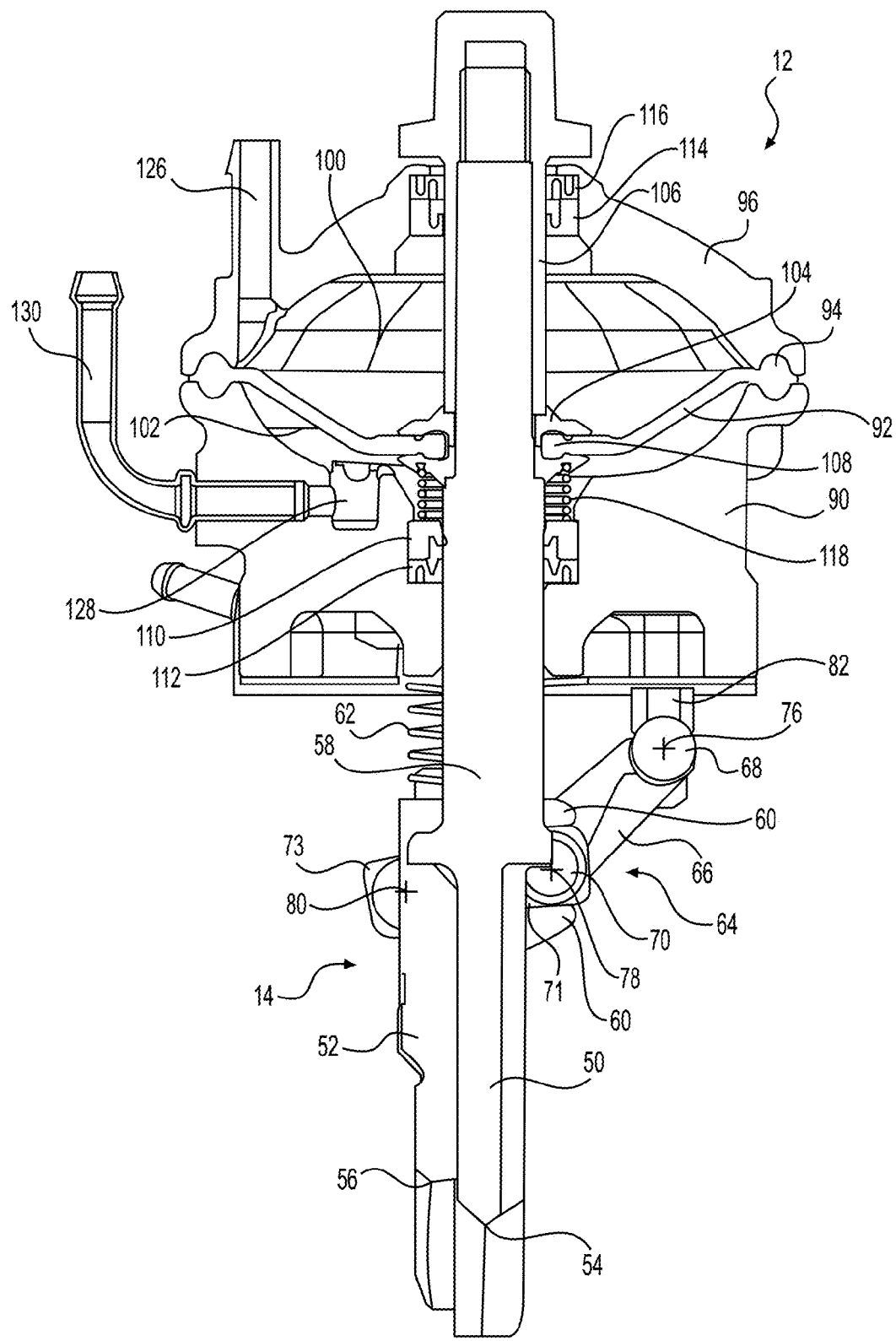
FIG. 4B is a cross-sectional view of the exhaust valve assembly of FIG. 4A taken through line 4B-4B of FIG. 4A.
Figure 4C:
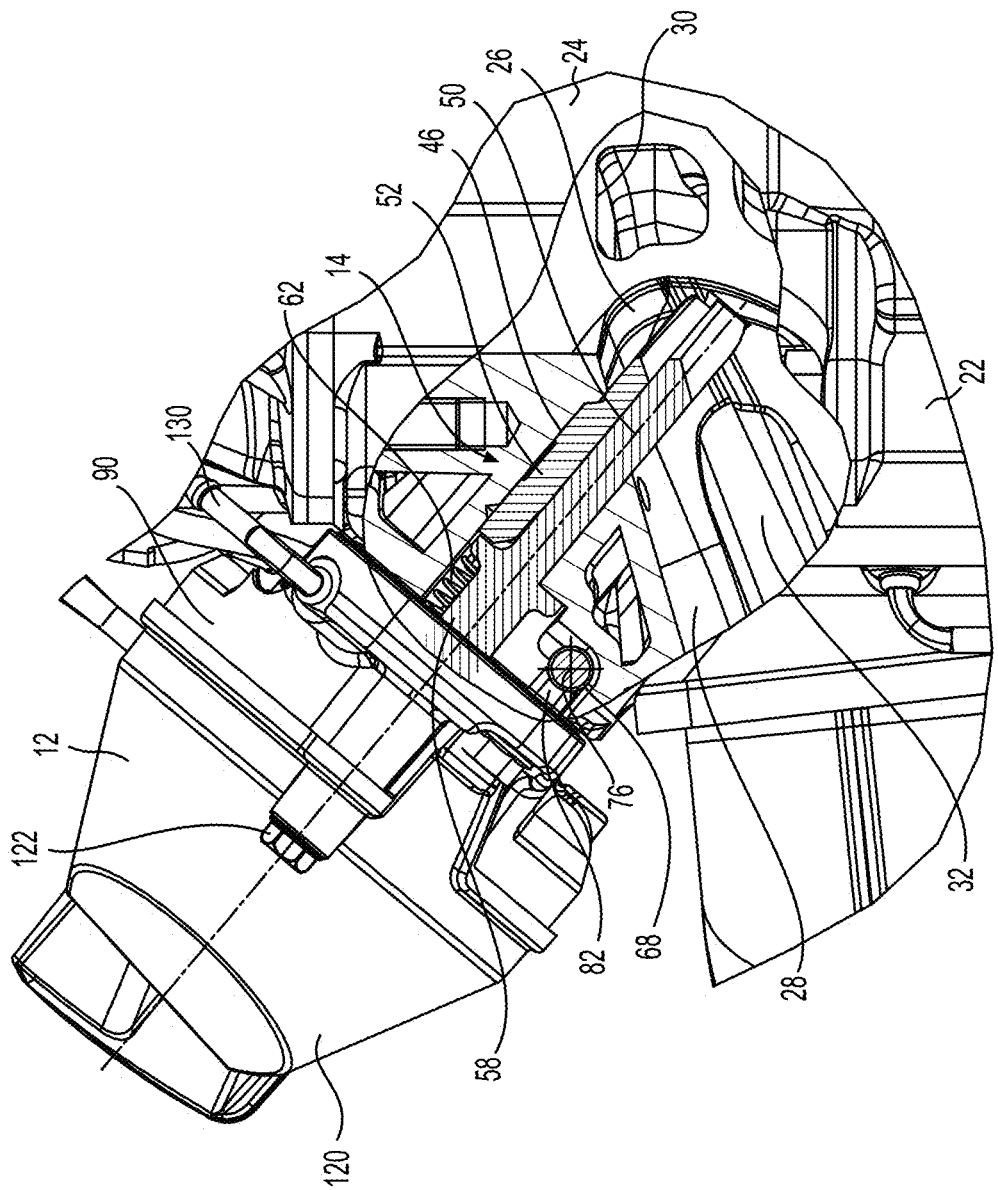
FIG. 4C is a partial cross-sectional view of the exhaust valve assembly in the position shown in FIG. 4A shown on the engine of FIG. 1.

Turning to FIGS. 4A to 4C, the two-part valve 14 will now be described. The two-part valve 14 includes a first valve part 50 and a second valve part 52. The first valve part 50 and the second valve part 52 each have an edge 54, 56 (FIG. 5A) respectively, shaped so as to match the shape of the cylinder 12. In operation, as in FIG. 4C, the second valve part 52 is supported and is disposed above the first valve part 50. The first valve part 50 has an integrally formed connector 58 which connects the first valve part 50 to the actuator 12. The second valve part 52 has two pairs of fingers 60, the lower ones of which are engaged by the first valve part 50 as the first valve part 50 is moved to a full flow position, as described in greater detail below. A pair of springs 62 is provided between the second valve part 52 and a bottom of the valve actuator 12.

As mentioned above, the exhaust valve assembly 10 also has auxiliary valves 16 for restricting the flow of exhaust gases in the auxiliary exhaust passages 32. The auxiliary valves 16 are separate from and movably connected to the two-part valve 14 via a lever 64. The lever 64 has two arms 66 that are connected to each other at one end by a shaft 68. The arms 66 have a generally obtuse V-shape. Shafts 70 extend inwardly from the corners of the V-shaped arms 66. Each shaft 70 has a bushing 71 disposed around it. The bushing 71 has a generally rectangular outer perimeter. Each bushing 71 is received between a corresponding pair of fingers 60 such that the shafts 70 can pivot inside their respective bushings 71 in the space between the two fingers 60 of their corresponding pairs of fingers 60. Shafts 72 extend outwardly from the ends of the arms 66 opposite the ends of the arms 66 where the shaft 68 is provided. Each shaft 72 has a bushing 73 disposed around it. The bushing 73 has a generally rectangular outer perimeter. The bushings 73 are received in oblong apertures 74 defined in the upper ends of the auxiliary valves 16. In the present implementation, a distance from the central axis 76 of the shaft 68 to the central axes 78 of the shafts 70 is greater than a distance from the central axes 78 of the shafts 70 to the central axes 80 of the shafts 72. Also, in the present implementation the angle between a line passing through the central axis 76 of the shaft 68 and the central axes 78 of the shafts 70 and a line passing through the central axes 78 of the shafts 70 and the central axes 80 of the shafts 72 is between 140 degrees and 150 degrees, but other angles are contemplated.

Posts 82 extend from a bottom of the actuator 12. The posts 82 each have an arcuate lower surface against which the shaft 68 abuts. As a result, when the second valve part 52 moves from its flow restricting position to its full flow position, the shafts 70 move with the second valve part 52. This movement of the shafts 70 causes the lever 64 to pivot about the central axis 76 of the shaft 68, thereby moving the auxiliary valves 16 from their flow restricting positions to their full flow positions as will be described in greater detail below.

The valve actuator 12 will now be described with respect to FIG. 4B. The valve actuator 12 has a valve housing 90. A diaphragm 92 has an outer lip 94 received in a recess defined in the valve housing 90. A pressure chamber wall 96 is connected to the valve housing 90 by fasteners (similar to fasteners 98 of the embodiment shown in FIG. 7). The pressure chamber wall 96 also has a recess that receives the outer lip 94 of the diaphragm 92. As a result, the diaphragm 92 is securely held between the valve housing 90 and the pressure chamber wall 96. The surfaces of the valve housing 90 and the pressure chamber wall 96 facing the diaphragm 92 are concave. The diaphragm 92 and the pressure chamber wall 96 define therebetween an upper pressure chamber 100 which has a variable volume. The diaphragm 92 and the valve housing 90 define therebetween a lower pressure chamber 102 which has a variable volume.

The connector 58 of the first valve part 50 passes through the valve housing 90, the diaphragm 92 and the pressure chamber wall 96. A ring 104 is provided around the connector 58. A sleeve 106 is disposed over the top portion of the connector 58. The sleeve 106 has internal threads in a top portion thereof and the connector has corresponding external threads on a top portion thereof. Accordingly, the sleeve 106 is retained on the connector 58 by screwing the sleeve 106 onto the connector 58. The bottom of the ring 104 abuts a shoulder defined by the connector 58 and the top of the ring 104 abuts the bottom end of the sleeve 106. As such the ring 104 cannot move along the length of the connector 58. The ring 104 has a groove receiving an inner lip 108 of the diaphragm 92. As a result, the connector 58 is connected to the diaphragm 92 so as to move therewith.

A ring 110 and a sealing ring 112 are disposed between the valve housing 90 and the connector 58 to guide the connector 58 as it moves with the diaphragm 92 and to prevent exhaust gases from entering the lower pressure chamber 102 from the guide channel 46. A ring 114 and a sealing ring 116 are disposed between the pressure chamber wall 96 and the sleeve 106 to guide the connector 58 as it moves with the diaphragm 92 and to prevent gases from entering or exiting the upper pressure chamber 100 via the passage defined in the pressure chamber wall 96 for the connector 58.

A spring 118 is disposed inside the lower pressure chamber 102 around the connector 58 between the rings 104 and 110. The spring 118 biases the first valve part 50 toward an intermediate position, shown in FIGS. 5A to 5C, described in greater detail below. It is contemplated that the spring 118 could be located elsewhere and still bias the first valve part 50 toward the intermediate position, such as between the first valve part 50 and a bottom of the valve housing 90. It is also contemplated that the spring 118 could be omitted completely and that the diaphragm 92 could be self-biasing so as to bias the first valve part 50 toward the intermediate position, by properly shaping the diaphragm 92 and by making it out of an appropriate material. It is also contemplated that the spring 118 could be omitted and that the diaphragm 92 could not be self-biasing.

Figure 2:
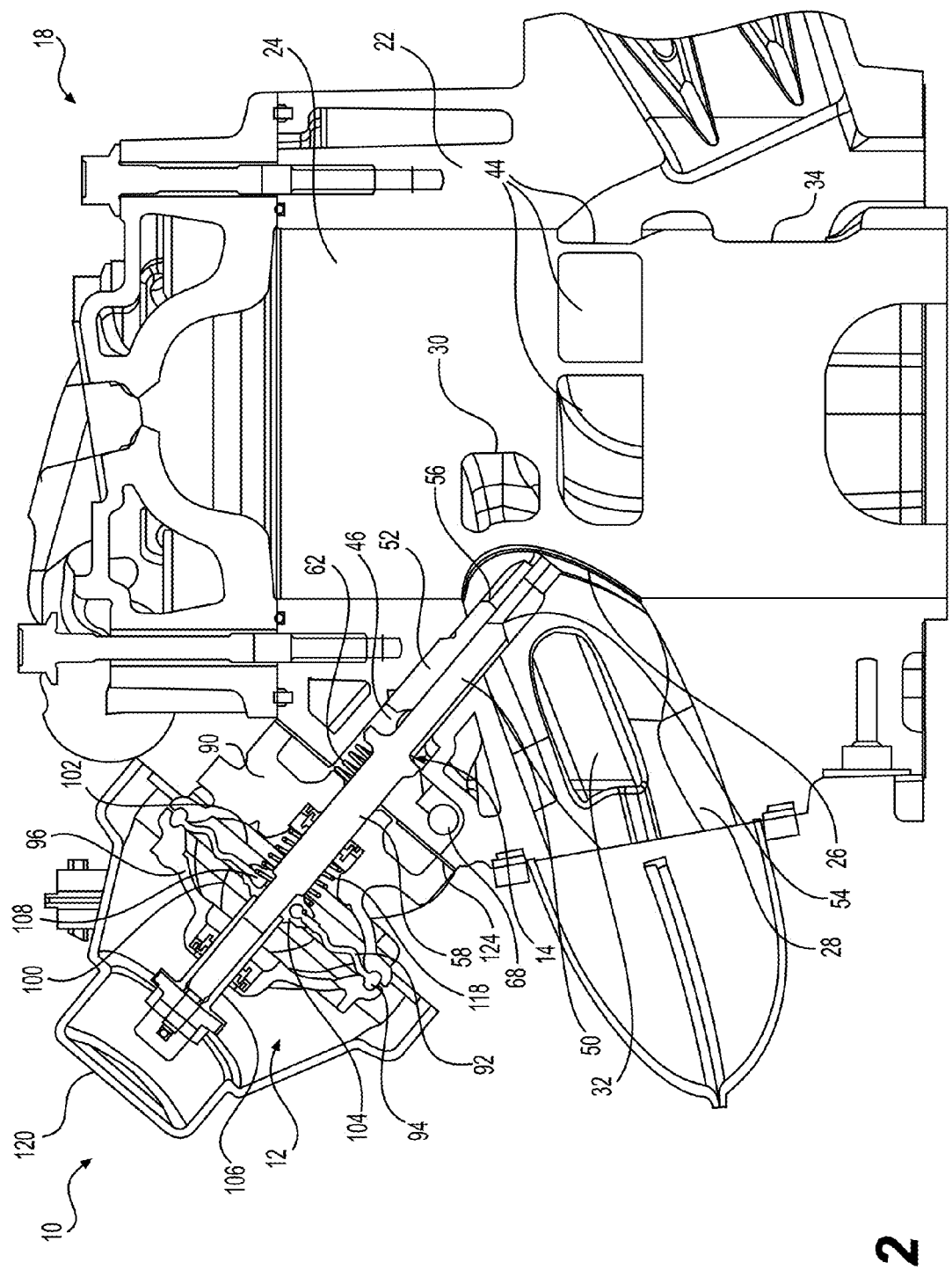
FIG. 2 is a partial cross-sectional view of a cylinder block, a cylinder head and one of the exhaust valve assemblies of the engine of FIG. 1.

A cover 120 (FIG. 4A) is connected to the valve housing 90 by bolts 122 to enclose the pressure chamber wall 96 and diaphragm 92 assembly therebetween. The valve housing 90 is connected to the cylinder block 22 via bolts (not shown). A seal 124 (FIG. 2) is disposed between the valve housing 90 and the cylinder block 22 to prevent exhaust gases from leaving the exhaust passage 28 via the guide channel 46. A passage 126 (FIG. 4B) defined in the pressure chamber wall 96 fluidly communicates the upper pressure chamber 100 with at least one pressure source, via a pressure control device, as described below. A passage 128 (FIG. 4C) defined in the valve housing 90 fluidly communicates the lower pressure chamber 102 with at least one pressure source, via a pressure control device, as described below. A pipe 130 is connected to the passage 128. It is contemplated that a port could be provided in the cover 120 to ventilate the volume between the pressure chamber wall 96 and the cover 120.

Figure 3:
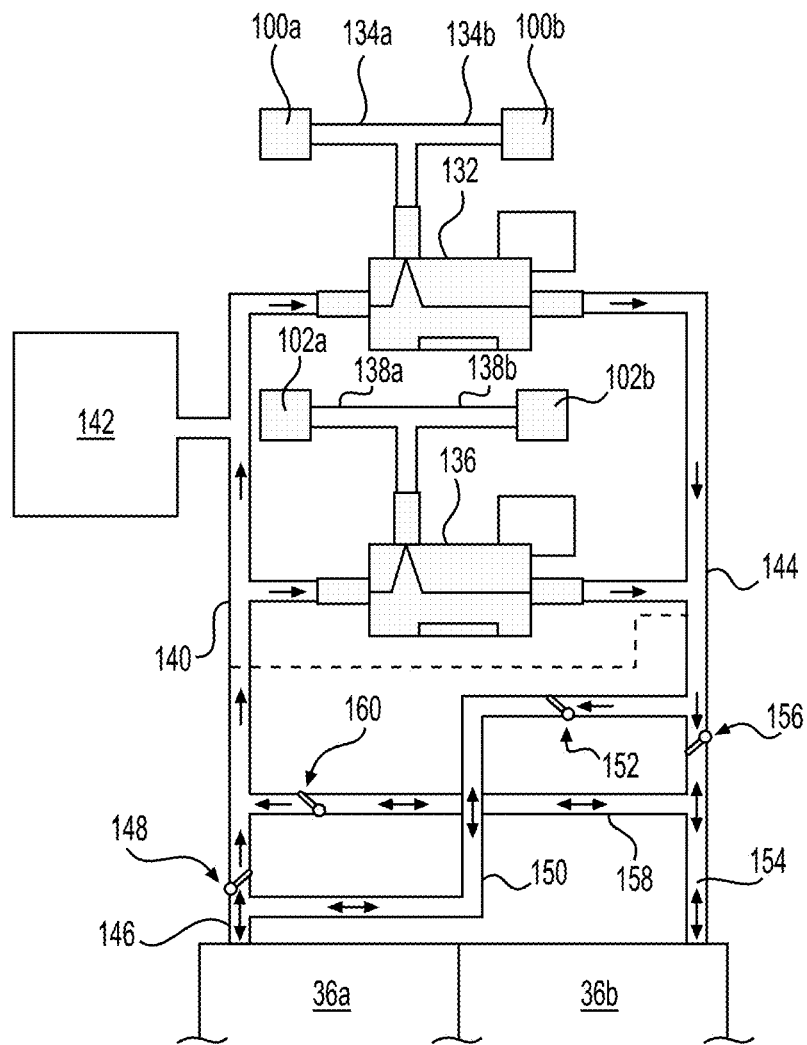
FIG. 3 is a schematic illustration of a pressure control system of the exhaust valve assemblies of the engine of FIG. 1.

FIG. 3 illustrates one possible implementation of a pressure control device for fluidly communicating the pressure chambers 100, 102 of the two valve actuators 12 of the engine 18 with a plurality of pressure sources. When no suffix is provided, reference is being made to the elements associated with both cylinders 24. During operation of the engine 18, positive and negative pressures are created inside the crankcase chambers 36. As a piston 40 moves down, pressure inside its corresponding crankcase chamber 36 increases to create a positive pressure in this chamber 36. As a piston 40 moves up, pressure inside its corresponding crankcase chamber 36 decreases to create a negative pressure. It is contemplated that in a turbocharged engine, the pressure inside a crankcase chamber 36 as its corresponding piston 40 moves up could still be a positive pressure, but this positive pressure would be less than the positive pressure created when the piston 40 moves down. It should be understood that when one of the crankcase chambers 36 has a positive pressure inside of it, the other of the crankcase chambers 36 has a negative pressure inside of it.

For purposes of explanation of FIG. 3, the reference numerals of elements associated with one of the two cylinders 24 are followed by the suffix A while the reference numerals of elements associated with the other one of the two cylinders 24 are followed by the suffix B. A control valve 132 fluidly communicates with the pressure chambers 100A, 100B via feed lines 134A, 134B respectively. The feed lines 134 are connected to the passages 126 defined in the pressure chamber walls 96. A control valve 136 fluidly communicates with the pressure chambers 102A, 102B via feed lines 138A, 138B respectively. The feed lines 138 are connected to the pipes 130. A feed line 140 fluidly communicates with the control valves 132, 136 to supply a positive pressure to the control valves 132, 136. An accumulator chamber 142 fluidly communicates with the feed line 140 to store pressurized air. The accumulator chamber 142 helps maintain a more even pressure inside the feed line 140. A feed line 144 is fluidly connected to the control valves 132, 136 to supply a negative pressure to the control valves 132, 136. A feed line 146 fluidly communicates the crankcase chamber 36A with the feed line 140. A one-way valve 148 only permits a positive pressure to be supplied to the feed line 140 from the feed line 146. A feed line 150 fluidly communicates the feed line 146 with the feed line 144. A one-way valve 152 only permits a negative pressure to be supplied to the feed line 144 from the feed line 150. A feed line 154 fluidly communicates the crankcase chamber 36B with the feed line 144. A one-way valve 156 only permits a negative pressure to be supplied to the feed line 144 from the feed line 154. A feed line 158 fluidly communicates the feed line 154 with the feed line 140. A one-way valve 160 only permits a positive pressure to be supplied to the feed line 140 from the feed line 158.

As a result of the above arrangement, when there is a positive pressure inside the crankcase chamber 36A and a negative pressure inside the crankcase chamber 36B, the valve 148 opens to supply the positive pressure from the crankcase chamber 36A to the feed line 140, the valve 156 opens to supply the negative pressure from the crankcase chamber 36B to the feed line 144, the valve 152 closes to prevent the positive pressure from the crankcase chamber 36A from being supplied to the feed line 144, and the valve 160 closes to prevent the negative pressure from the crankcase chamber 36B from being supplied to the feed line 140. Similarly, when there is a negative pressure inside the crankcase chamber 36A and a positive pressure inside the crankcase chamber 36B, the valve 152 opens to supply the negative pressure from the crankcase chamber 36A to the feed line 144, the valve 160 opens to supply the positive pressure from the crankcase chamber 36B to the feed line 140, the valve 148 closes to prevent the negative pressure from the crankcase chamber 36A from being supplied to the feed line 140, and the valve 156 closes to prevent the positive pressure from the crankcase chamber 36B from being supplied to the feed line 144.

By selectively opening and closing the control valve 132, it is thus possible to supply one of a positive pressure and a negative pressure to the pressure chambers 100 of the valve actuators 12. Similarly, by selectively opening and closing the control valve 136, it is thus possible to supply one of a positive pressure and a negative pressure to the pressure chambers 102 of the valve actuators 12. By cycling the opening and closing of the control valves 132, 136, a pressure intermediate to the positive and negative pressure can be supplied to the pressure chambers 100, 102. It is contemplated that this intermediate pressure could be equivalent to an ambient pressure or close to it. It is contemplated additional valves could be provided such that the pressure chambers 100, 102 could also be selectively communicated with the atmosphere to be supplied with the ambient pressure. An electronic control unit (not shown) determines which pressure is to be supplied to the pressure chambers 100, 102 based on the engine speed, as described below, and opens and closes the valves 132, 136 accordingly so as to obtain a desired position of the valves 14, 16 of the valve assemblies 10. It is contemplated that the electronic control unit could also determine which pressure is to be supplied to the pressure chambers 100, 102 based on other operating conditions of the engine 18 or of components associated with the engine 18, such as, for example, a degree of throttle opening or a rate of acceleration of the engine 18 or a combination of two or more of the engine speed, the degree of throttle opening, the rate of acceleration.

Other pressure control devices are contemplated. For example, the one-way valves could be replaced electronically controlled valves. In another example, the feed lines 150, 158 and the one-way valves 152, 160 could be omitted such that the feed line 140 is only supplied with positive pressure from the crankcase chamber 36A and the feed line 144 is only supplied with negative pressure from the crankcase chamber 36B. In another example, the control valves 132, 136 are replaced by a control valve fluidly communicating with the feed line 140 to supply positive pressure to the pressure chambers 100A, 100B or to the pressure chambers 102A, 102B and a control valve fluidly communicating with the feed line 144 to supply negative pressure to the pressure chambers 100A, 100B or to the pressure chambers 102A, 102B. It is also contemplated that the pressures supplied to the pressure chambers 100, 102 could be provided from sources other than the crankcase chambers 26. For example, a compressor could be used to supply the positive pressure and a vacuum pump could be used to supply the negative pressure. In another example, a compressor is also used to supply the positive pressure and, instead of supplying a negative pressure, the pressure chambers can be selectively communicated with the atmosphere to be supplied with ambient pressure.

Figure 5A:
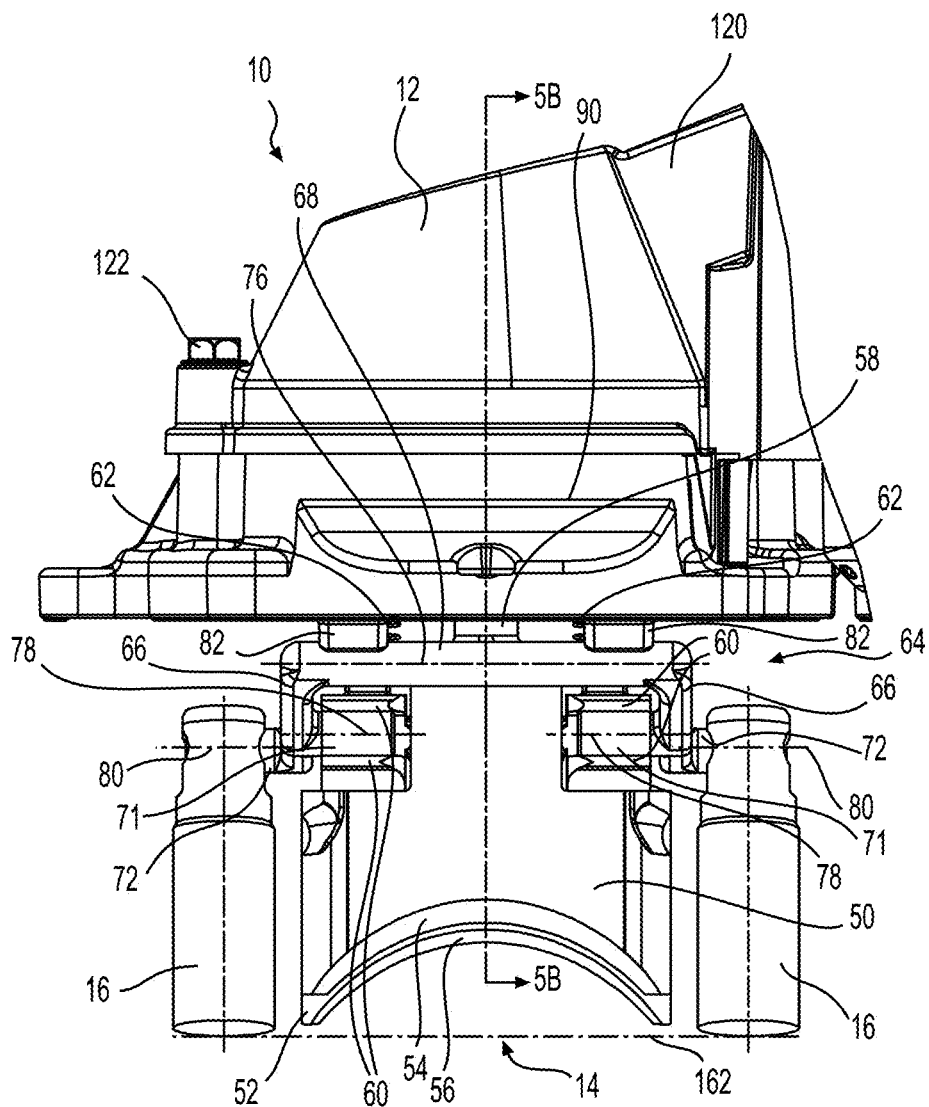
FIG. 5A is a front elevation view the exhaust valve assembly of FIG. 4A with the first valve part in an intermediate position and the second valve part and the auxiliary valves in flow restricting positions.
Figure 5B:
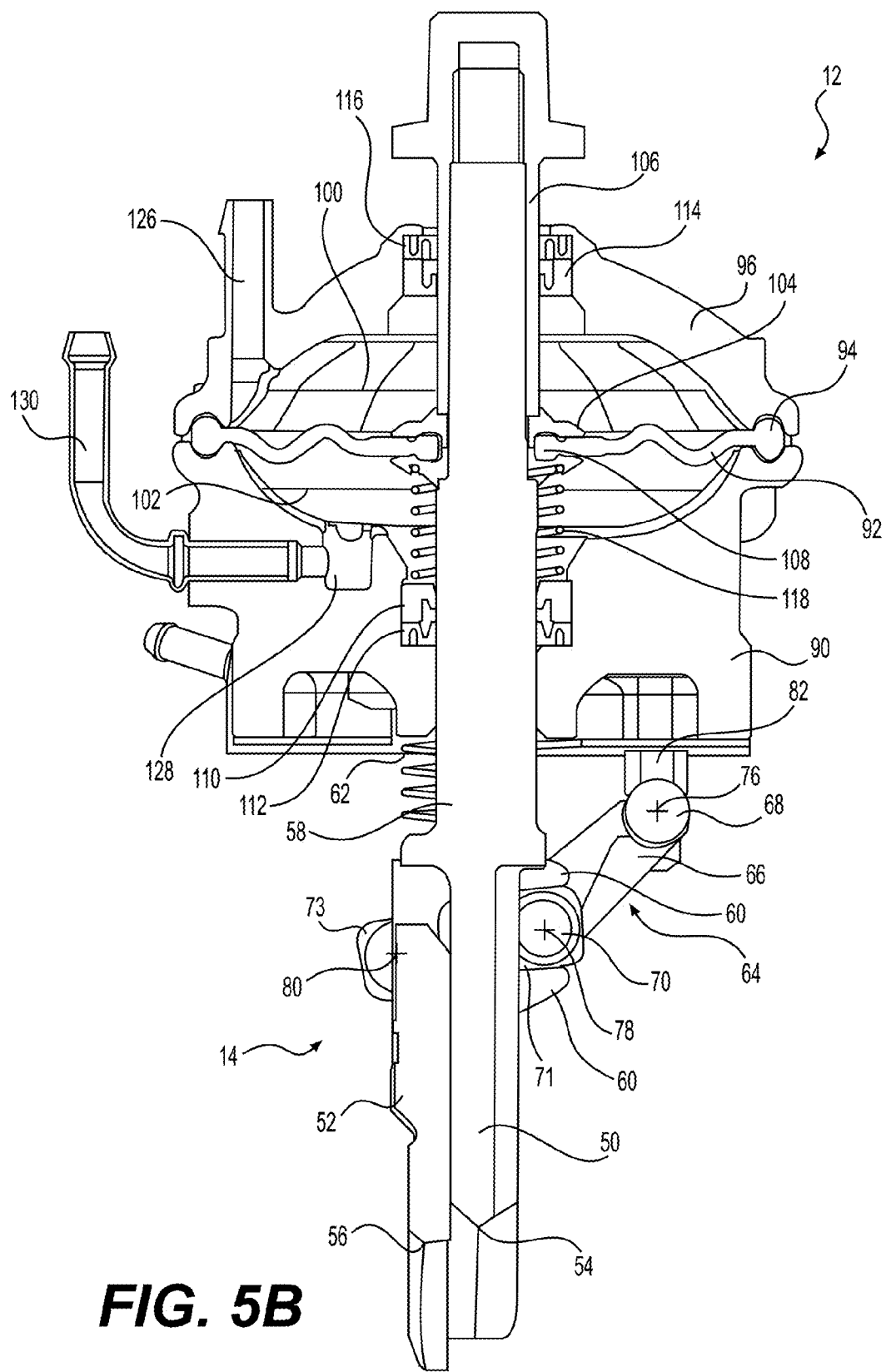
FIG. 5B is a cross-sectional view of the exhaust valve assembly of FIG. 5A taken through line 5B-5B of FIG. 5A.
Figure 5C:
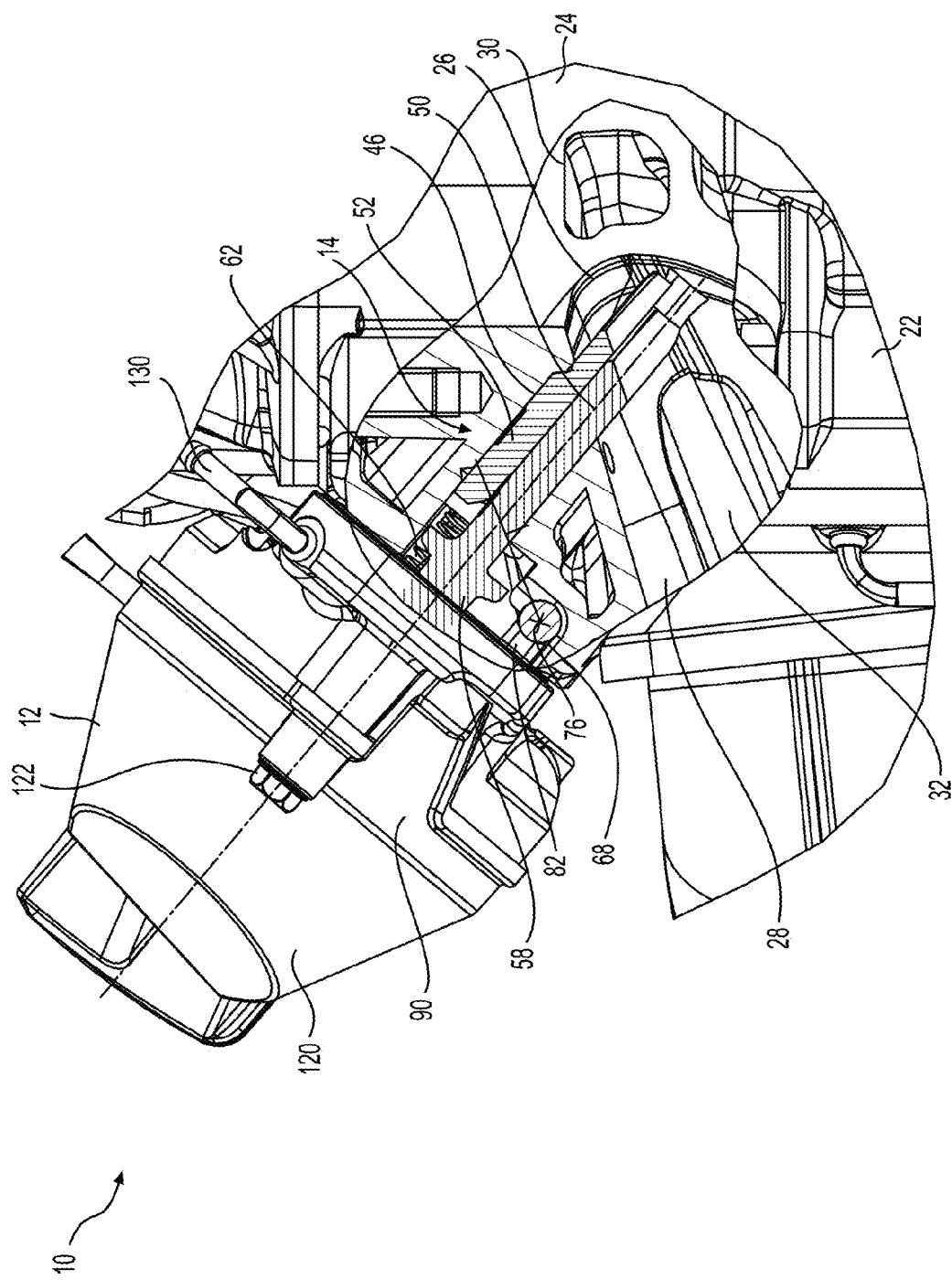
FIG. 5C is a partial cross-sectional view of the exhaust valve assembly in the position shown in FIG. 5A shown on the engine of FIG. 1.
Figure 6A:
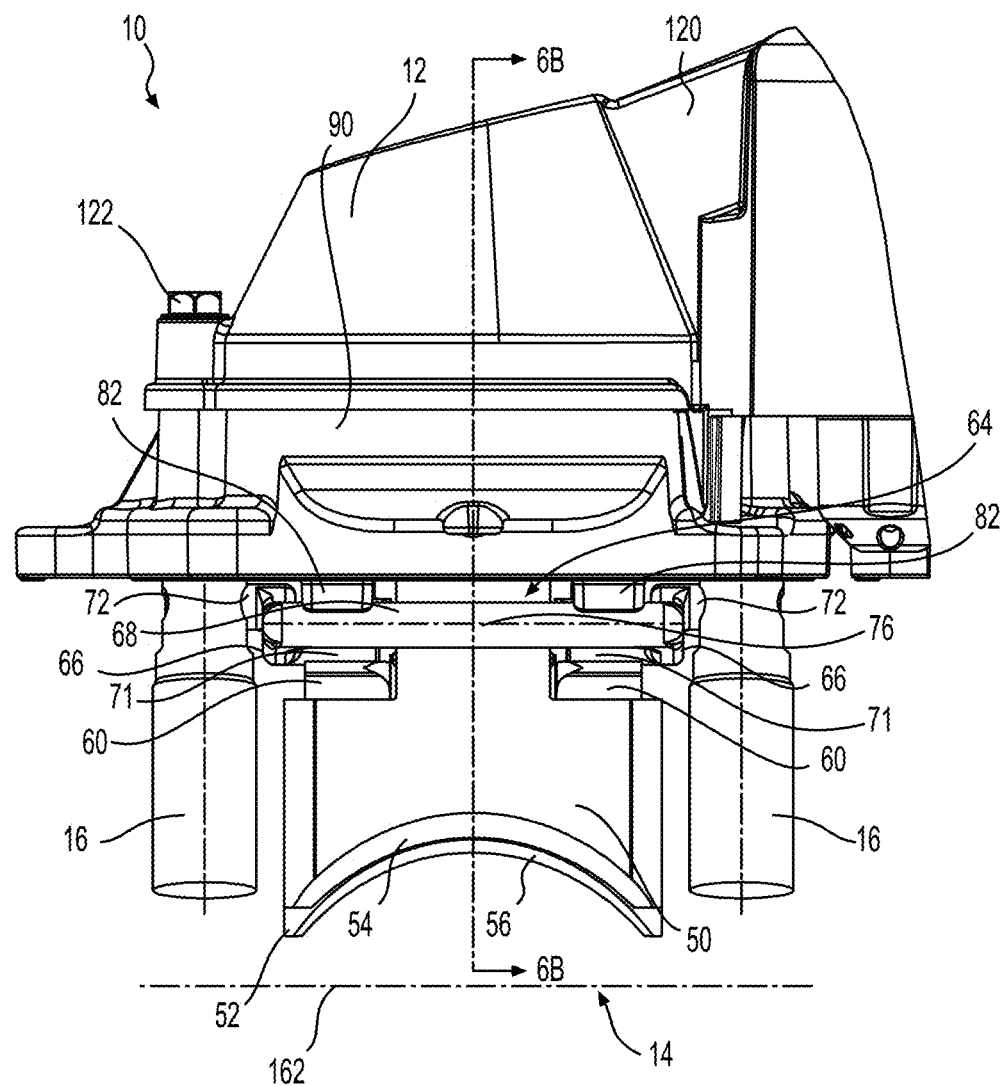
FIG. 6A is a front elevation view the exhaust valve assembly of FIG. 4A with the first valve part, the second valve part and the auxiliary valves in full flow positions.

The operation of one of the valve assemblies 10 will now be described in association with FIGS. 4A to 6C. Line 162 in FIGS. 4A, 5A and 6A is a line passing through the points where the ends of the edge 54 of the first valve part 50 meet the cylinder 24 when the first valve part 50 is in its flow restricting position shown in FIG. 4A. Line 162 has been added simply to illustrate the movement of the valves 14, 16 relative to the cylinder 24.

As previously mentioned, at low engine speeds, it is desirable to restrict the flow of the exhaust gases through the exhaust port 26 and auxiliary exhaust ports 30. Thus, at low engine speeds, the valve 14 is moved to the position shown in FIGS. 4A to 4C. To move the valve 14 to this position, a positive pressure is supplied to the pressure chamber 100 and a negative pressure is supplied to the pressure chamber 102. The pressure difference between the pressure chambers 100, 102 is sufficient to overcome the bias of the spring 118. This causes the spring 118 to be in compression and the diaphragm 92 moves the first valve part 50 in a flow restricting position in the exhaust port 26. The second valve part 52 is held in a flow restricting position by the bias of springs 62. The auxiliary valves 16 which move with the second valve part 52 via the lever 64 are also held in their flow restricting positions in the auxiliary exhaust passages 30.

At medium engine speeds, it is desirable to restrict the flow of the exhaust gases through the exhaust port 26, but to a lesser degree than at low engine speeds. It has also been found that it is desirable to restrict the flow of exhaust gases through the auxiliary exhaust ports 30 to the same degree as at low engine speeds. Thus, at medium engine speeds, the valve 14 is moved to the position shown in FIGS. 5A to 5C. To move the valve 14 to this position, a pressure intermediate the positive and negative pressures is supplied to the pressure chambers 100, 102. The pressure difference between the pressure chambers 100, 102 is insufficient to overcome the bias of the spring 118 and the diaphragm 92 is moved by the spring 118 to the position shown in FIG. 5B. In this position, the spring 118 is slightly compressed due to the bias applied by springs 62 on the first valve part 50 via the lower fingers 60 of the second valve part 52. The diaphragm 92 moves the first valve part 50 in an intermediate position in the exhaust port 26. The intermediate position is intermediate the full flow position (FIG. 6A to 6C) and the flow restricting position (FIG. 4A to 4C) of the first valve part 50. The second valve part 52 is held in its flow restricting position by the bias of springs 62. As such, the auxiliary valves 16 are also held in their flow restricting positions in the auxiliary exhaust passages 30. As the position of the diaphragm 92 is determined by the difference in pressures between the pressure chambers 100, 102, it is contemplated that the position of the diaphragm 92 shown in FIG. 5B could also be achieved by supplying the positive pressure to both pressure chambers 100, 102 or by supplying the negative pressure to both pressures chambers 100, 102. It is also contemplated that the pressures inside the pressure chambers 100, 102 do not have to be equal to obtain the position of the diaphragm 92 shown in FIG. 5B, the pressures inside the pressure chambers 100, 102 could be different but substantially equal such that the difference between the pressures inside the pressure chambers 100, 102 is insufficient to overcome the bias of the spring 118.

At high engine speeds, it is desirable that the exhaust gases flow freely through the exhaust port 26 and auxiliary exhaust ports 30. Thus, at high engine speeds, the valve 14 is moved to the position shown in FIGS. 6A to 6C. To move the valve 14 to this position, a negative pressure is supplied to the pressure chamber 100 and a positive pressure is supplied to the pressure chamber 102. As a result of the pressure difference between the pressure chambers 100, 102, the diaphragm 92 moves to the position shown in FIG. 6B. This causes the spring 118 to be in extension. The diaphragm 92 moves the first valve part 50 in a full flow position where it is withdrawn from the exhaust port 26. As it is moved to its full flow position, the first valve part 50 pushes against the lower fingers 60 of the second valve part 52 and moves the second valve part 52 to a full flow position where it is withdrawn from the exhaust port 26. When the second valve part 52 is in its full flow position the springs 62 are in compression. As the second valve part 52 moves to its full flow position, the fingers 60 lift the shafts 70 of the lever 64 with the second valve part 52. As a result, since the shaft 68 abuts the posts 82, the lever 64 pivots about the central axis 76 of the shaft 68 thereby causing the auxiliary valves 16 to move to full flow positions where they are withdrawn from the auxiliary exhaust ports 30.

The ranges of engine speeds corresponding to low, medium and high engine speeds providing the above described valve positions depend on the specific configuration of the engine and its associated components and on the desired performance characteristics of the engine.

Figure 6B:
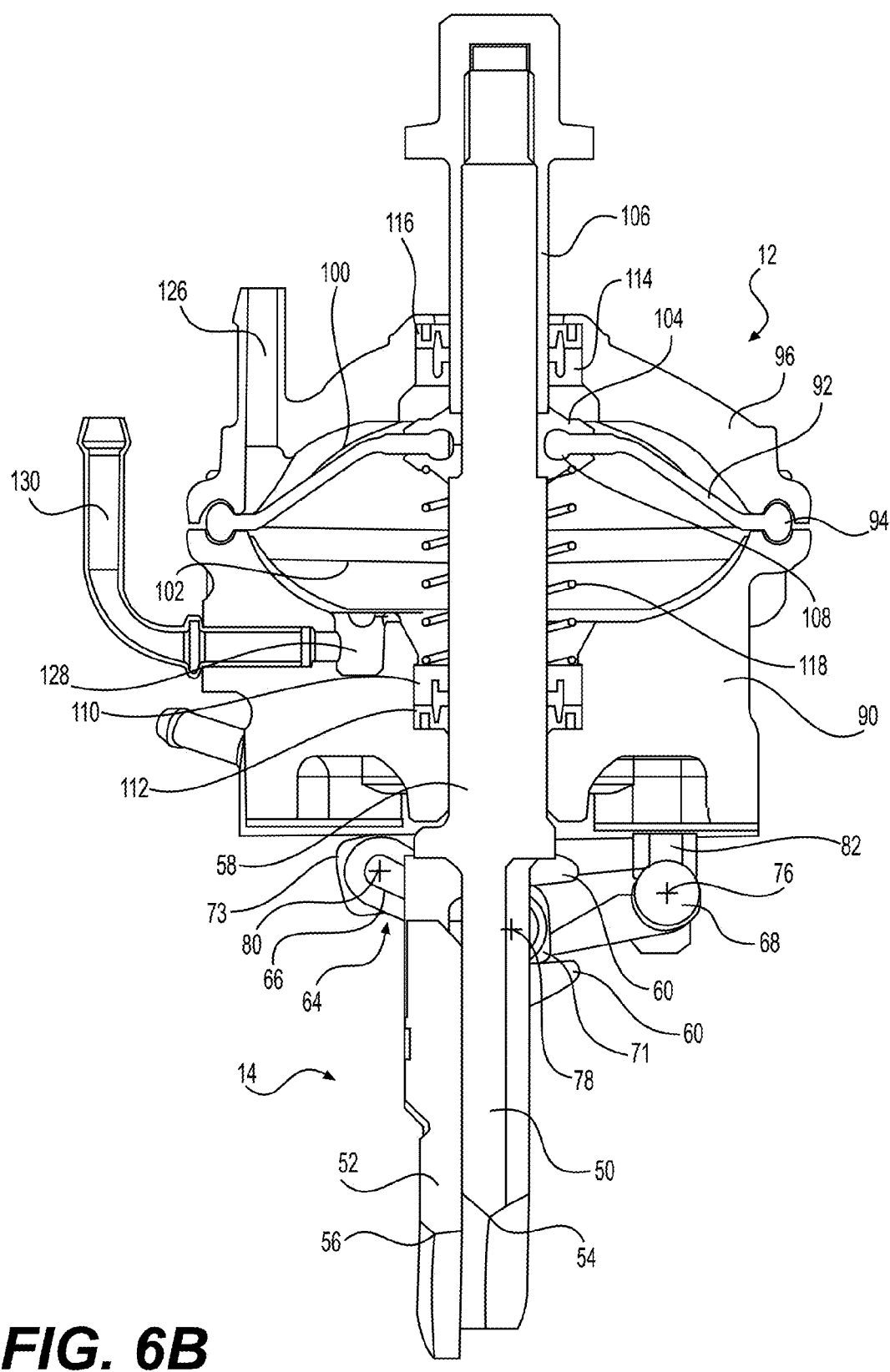
FIG. 6B is a cross-sectional view of the exhaust valve assembly of FIG. 6A taken through line 6B-6B of FIG. 6A.
Figure 6C:
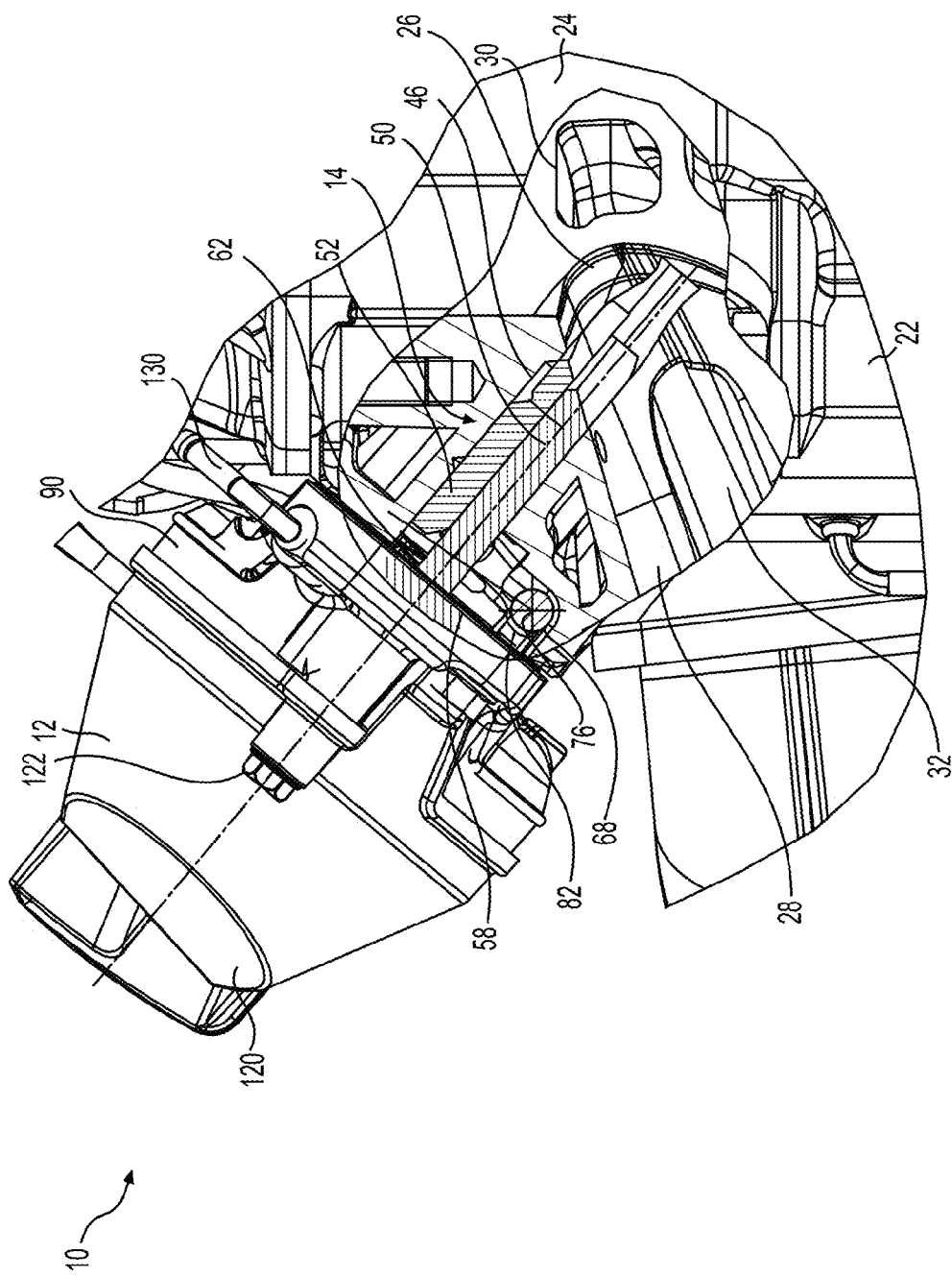
FIG. 6C is a partial cross-sectional view of the exhaust valve assembly in the position shown in FIG. 6A shown on the engine of FIG. 1.

Due to the geometry of the arms 66 of the lever 64, the distance travelled by the auxiliary exhaust valves 16 between their flow restricting positions shown in FIGS. 4A to 4C and 5A to 5C and their full flow positions shown in FIGS. 6A to 6C is greater than the distance travelled by the first valve part 50 between its flow restricting position shown in FIGS. 4A to 4C and its full flow position shown in FIGS. 6A to 6C. Therefore, for implementations having equivalent displacement of the first valve part 50, since the auxiliary exhaust valves 16 in the implementation described above can be displaced by a greater amount than if they were connected to the first valve part 50 to move therewith, as in U.S. Pat. No. 7,484,482 for example, the exhaust ports 30 and exhaust passages 32 can have a greater height for the same dimension of auxiliary valves 16 than in implementations where the auxiliary valves 16 are connected to the first valve part 50 to move therewith.

Figure 7:
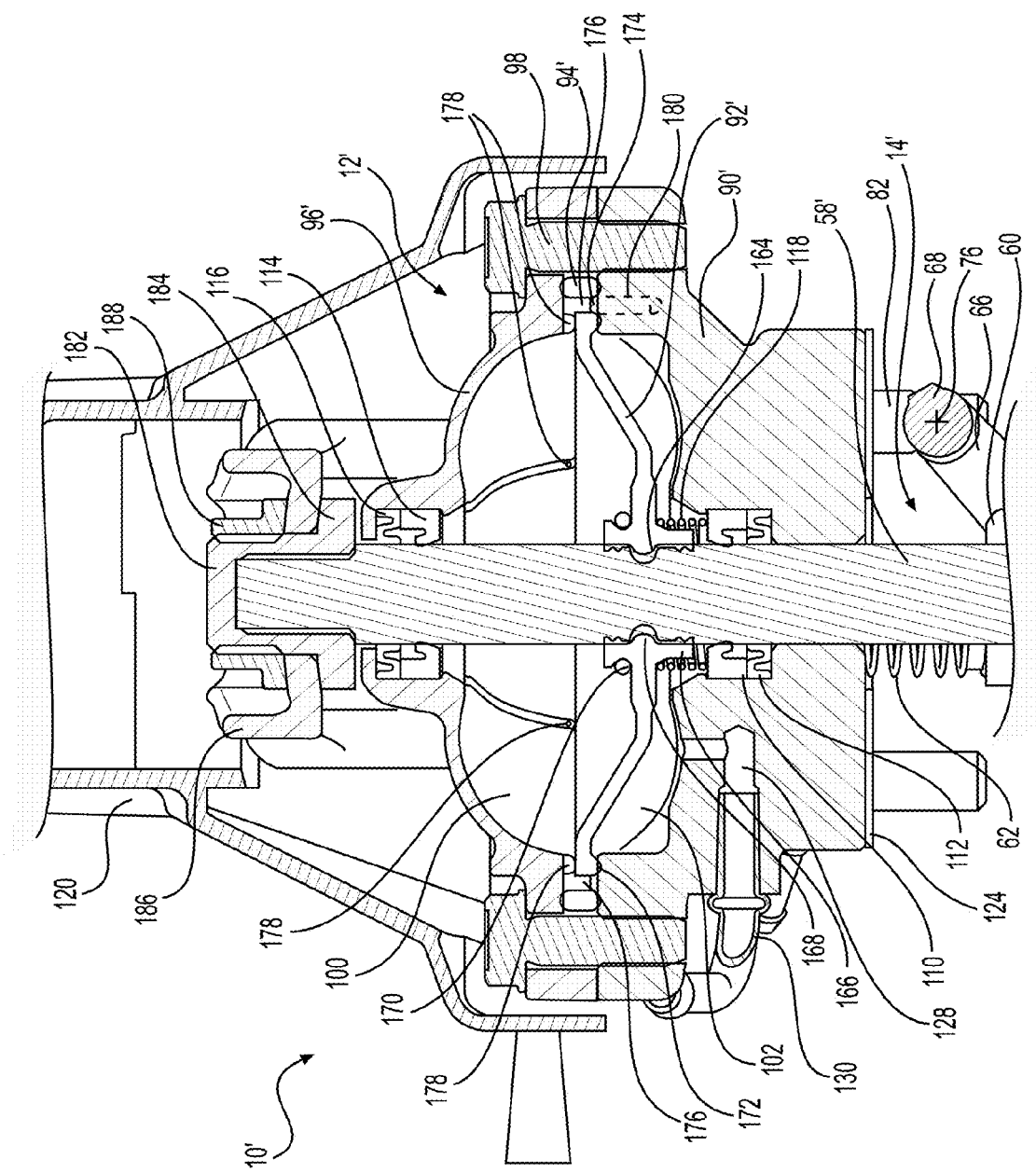
FIG. 7 is a cross-sectional view of a portion of an alternative implementation of an exhaust valve assembly having an alternative implementation of a valve actuator.

Turning now to FIG. 7, an exhaust valve assembly 10' will be described. The exhaust valve assembly 10' has a valve actuator 12', a two-part valve 14' connected to the actuator 12 and auxiliary valves 16 (not shown in this implementation) connected to the valve 14'. The auxiliary valves 16 are connected to the valve 14' in the same manner as the auxiliary valves 16 are connected to the valve 14 in the exhaust valve assembly 10 described above. The valve 14' is the same as the valve 14 described above except that the connector 58 has been replaced by a connector 58'. The valve actuator 12' moves the valve 14' and the auxiliary valves 16 between the various positions illustrated in FIGS. 4A to 6C and described above for the exhaust valve assembly 10. For simplicity, features of the exhaust valve assembly 10' that are similar to those of the exhaust valve assembly 10 described above have been labeled with the same reference numerals and will not be described again.

The connector 58' has a peripheral groove 164. The diaphragm 92' defines an inner sleeve 166 inside which the connector 58' is received. The sleeve 166 defines a protrusion 168 that is received in the peripheral groove 164 of the connector 58' to secure the diaphragm 92' to the connector 58'. A spring clip 170 is disposed around the upper part of the sleeve 166 to further secure the sleeve 166 to the connector 58' and to prevent fluid present in the pressure chambers 100, 102 to flow from one to the other via the interface between the sleeve 166 and the connector 58'.

The diaphragm 92' has an outer lip 94' and an outer lip 172 disposed radially inwardly of the outer lip 94'. The outer lips 94', 172 are held between the valve housing 90' and the pressure chamber wall 96'. A circular passage 174 is defined between the outer lips 94', 172 and the top surface of the valve housing 90'. Apertures 176 are defined around the portion of the diaphragm 92' disposed radially between the outer lips 94', 172 and fluidly communicate with the circular passage 174. Apertures 178 are defined between the outer lip 172 and the pressure chamber wall 96' and fluidly communicate the pressure chamber 102 with the apertures 176. A passage 180 is defined in the valve housing 90'. The passage 180 is selectively connected to positive pressure and negative pressure sources via the pressure control device described above with respect to FIG. 3 for example. The passage 180 supplies pressure to the circular passage 174, which is then supplied to the pressure chamber 102 via the apertures 176 and 178.

A cap 182 having a flange 184 is screwed onto the end of the connector 58' that is disposed outside of the pressure chamber 102. A valve connecting member 186 is connected to the cap 182 by a nut 188 such that the valve connecting member 186 is held between the nut 188 and the flange 184. The valve connecting member 186 is similarly connected to an adjacent exhaust valve assembly 10'. The valve connecting member 186 is similar to the valve connecting member described in U.S. Pat. No. 7,762,220 B2, issued Jul. 27, 2010, the entirety of which is incorporated herein by reference. It is contemplated that the valve connecting member 186, the cap 182 and the nut 188 could be omitted. It is also contemplated that a valve connecting member similar to the valve connecting member 186 could be provided to connect two adjacent exhaust valve assemblies 10.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An exhaust valve assembly for a two-stroke internal combustion engine comprising:
   a valve actuator having a first pressure chamber and a second pressure chamber,
   the first pressure chamber being adapted for selectively receiving one of a first pressure and a second pressure,
   the second pressure chamber being adapted for selectively receiving one of the first pressure and the second pressure,
   the first pressure being higher than the second pressure; and
   a valve operatively connected to the valve actuator, the valve actuator moving the valve between at least a first valve position and a second valve position,
   the valve actuator moving the valve to the first valve position when the first pressure is supplied to the first pressure chamber and the second pressure is supplied to the second pressure chamber, and
   the valve actuator moving the valve to the second valve position when the second pressure is supplied to the first pressure chamber and the first pressure is supplied to the second pressure chamber.

2. The exhaust valve assembly of claim 1, wherein the valve actuator moves the valve between the first valve position, the second valve position and a third valve position, the third valve position being intermediate the first and second valve positions; and
   wherein the valve actuator moves the valve to the third valve position when pressures supplied to the first pressure chamber and the second pressure chamber are equal or substantially equal.

3. The exhaust valve assembly of claim 2, wherein the valve actuator moves the valve to the third valve position when one of:
   the first pressure is supplied to both the first pressure chamber and the second pressure chamber; and
   the second pressure is supplied to both the first pressure chamber and the second pressure chamber.

4. The exhaust valve assembly of claim 2, wherein the valve actuator moves the valve to the third valve position when a third pressure is supplied to both the first pressure chamber and the second pressure chamber, the third pressure being intermediate the first and second pressures.

5. The exhaust valve assembly of claim 2, further comprising a spring biasing the valve toward the third valve position.

6. The exhaust valve assembly of claim 1, wherein:
   the valve actuator comprises a diaphragm separating the first pressure chamber from the second pressure chamber;
   the diaphragm being movable between a first diaphragm position and a second diaphragm position;
   the diaphragm being in the first diaphragm position when the first pressure is supplied to the first pressure chamber and the second pressure is supplied to the second pressure chamber;
   the diaphragm being in the second diaphragm position when the second pressure is supplied to the first pressure chamber and the first pressure is supplied to the second pressure chamber;
   the valve being in the first valve position when the diaphragm is in the first diaphragm position;
   the valve being in the second valve position when the diaphragm is in the second diaphragm position.

7. The exhaust valve assembly of claim 6, further comprising a spring biasing the valve toward a third valve position, the third valve position being intermediate the first and second valve positions.

8. The exhaust valve assembly of claim 7, wherein the spring biases the diaphragm toward a third diaphragm position, the third diaphragm position being intermediate the first and second diaphragm positions, the valve being in the third valve position when the diaphragm is in the third diaphragm position.

9. The exhaust valve assembly of claim 8, wherein the spring is disposed in the second pressure chamber.

10. The exhaust valve assembly of claim 6, wherein the valve actuator further comprises:
    a valve housing connected to the diaphragm, the second pressure chamber being defined between the valve housing and the diaphragm, the valve housing being adapted to connect the valve actuator to the engine; and
    a pressure chamber wall connected to the diaphragm, the first pressure chamber being defined between the pressure chamber wall and the diaphragm.

11. The exhaust valve assembly of claim 10, wherein the valve extends through the valve housing, the diaphragm and the pressure chamber wall.

12. The exhaust valve assembly of claim 1, further comprising:
    a first control valve fluidly communicating with the first pressure chamber;
    a second control valve fluidly communicating with the second pressure chamber;
    a first feed line fluidly communicating with the first and second control valves for supplying the first pressure to the first and second control valves; and
    a second feed line fluidly communicating with the first and second control valves for supplying the second pressure to the first and second control valves;
    the first control valve selectively fluidly communicating the first pressure chamber with one of the first and second feed lines; and
    the second control valve selectively fluidly communicating the second pressure chamber with one of the first and second feed lines.

13. The exhaust valve assembly of claim 12, further comprising an accumulator chamber fluidly communicating with the first feed line.

14. The exhaust valve assembly of claim 12, wherein:
    the first control valve alternatively fluidly communicates the first pressure chamber with the first and second feed lines to have a third pressure in the first pressure chamber;
    the second control valve alternatively fluidly communicates the second pressure chamber with the first and second feed lines to have the third pressure in the second pressure chamber;

the third pressure is intermediate the first and second pressures;

the valve actuator moving the valve to a third position when the third pressure is provided in the first and second pressure chambers; and the third position being intermediate the first and second positions.

15. An internal combustion engine comprising:
a crankcase defining a crankcase chamber;
a crankshaft disposed in the crankcase;
a cylinder block connected to the crankcase, the cylinder block having an exhaust passage;
a cylinder disposed in the cylinder block;
a piston movably disposed within the cylinder and being operatively connected to the crankshaft; and
the valve assembly of claim 1 connected to the cylinder block;
wherein in the first valve position, the valve extends in the exhaust passage and, in the second valve position, the valve is withdrawn from the exhaust passage.

16. The engine of claim 15, wherein:
the first and second pressure chambers selectively fluidly communicate with the crankcase chamber;
the first pressure is a positive pressure and the second pressure is a negative pressure;
the crankcase chamber selectively supplying the positive pressure to at least one of the first and second pressure chambers as the piston moves toward the crankcase; and
the crankcase chamber selectively supplying the negative pressure to at least one of the first and second pressure chambers as the piston moves away from the crankcase.

17. The engine of claim 16, further comprising:
a first one-way valve permitting the positive pressure to be selectively supplied to at least one of the first and second pressure chambers and preventing the negative pressure to be selectively supplied to at least one of the first and second pressure chambers; and
a second one-way valve permitting the negative pressure to be selectively supplied to at least one of the first and second pressure chambers and preventing the positive pressure to be selectively supplied to at least one of the first and second pressure chambers.

18. A method of operating an exhaust valve assembly of a two-stroke internal combustion engine, the valve assembly including: a valve actuator having a first pressure chamber and a second pressure chamber, and a valve operatively connected to the valve actuator, the method comprising:
moving the valve to a first valve position by supplying a first pressure to the first pressure chamber and a second pressure to the second pressure chamber; and
moving the valve to a second valve position by supplying the second pressure to the first pressure chamber and the first pressure to the second pressure chamber, the first pressure being higher than the second pressure.

19. The method of claim 18, further comprising moving the valve to a third valve position by supplying equal or substantially equal pressures to the first pressure chamber and the second pressure chamber, the third valve position being intermediate the first and second valve positions.

20. The method of claim 19, further comprising biasing the valve toward the third valve position using a spring.

* * * * *